United States Patent
Harris et al.

(10) Patent No.: US 10,619,472 B2
(45) Date of Patent: Apr. 14, 2020

(54) LMI-BASED CONTROL OF STICK-SLIP OSCILLATIONS IN DRILLING

(71) Applicant: Board of Regents, The University of Texas System, Austin, TX (US)

(72) Inventors: Matthew W. Harris, Magnolia, TX (US); Behcet Acikmese, Austin, TX (US); Eric Van Oort, Bee Cave, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 157 days.

(21) Appl. No.: 15/456,108

(22) Filed: Mar. 10, 2017

(65) Prior Publication Data
US 2017/0183953 A1    Jun. 29, 2017

Related U.S. Application Data

(63) Continuation of application No. PCT/US2015/049343, filed on Sep. 10, 2015.
(Continued)

(51) Int. Cl.
*E21B 44/00* (2006.01)
*E21B 44/04* (2006.01)
(Continued)

(52) U.S. Cl.
CPC ............... *E21B 44/04* (2013.01); *E21B 3/02* (2013.01); *E21B 44/00* (2013.01); *E21B 47/00* (2013.01);
(Continued)

(58) Field of Classification Search
CPC ............................ E21B 44/00; E21B 41/0092
See application file for complete search history.

(56) References Cited

U.S. PATENT DOCUMENTS 5,842,149 A * 11/1998 Harrell ................... E21B 44/00
702/9
2010/0268353 A1  10/2010 Crisalle et al.
(Continued)

FOREIGN PATENT DOCUMENTS

WO       2016/040573       3/2016

OTHER PUBLICATIONS

Apostolos Doris, "Output-feedback design for non-smooth mechanical systems: Control synthesis and experiments" Sep. 11, 2007 Eindhoven University.*

(Continued)

*Primary Examiner* — Kipp C Wallace
(74) *Attorney, Agent, or Firm* — Baker Botts L.L.P.

(57) ABSTRACT

A control system for controlling stick-slip oscillations in a drilling system is disclosed. The control system includes a processor and a memory communicatively coupled to the processor with computer program instructions stored therein. The instructions are configured to, when executed by the processor, cause the processor to receive a communication including a value of a drilling system parameter, determine based on the value of the drilling system parameter, a value for a torque to be applied to a drill string to reduce the effect of stick-slip oscillations, and transmit to a drive system the value for the torque to be applied by the drive system. The value for the torque to be applied by the drive system is determined by solving a set of linear matrix inequalities including a disturbance minimization linear matrix inequality, a first magnitude constraint linear matrix inequality, and a second magnitude constraint linear matrix inequality.

12 Claims, 5 Drawing Sheets

Related U.S. Application Data (60) Provisional application No. 62/049,146, filed on Sep. 11, 2014.

(51) Int. Cl.
| | | |
|---|---|---|
| *E21B 3/02* | (2006.01) | |
| *E21B 47/00* | (2012.01) | |
| *E21B 47/024* | (2006.01) | |
| *E21B 47/12* | (2012.01) | |
| *G05B 19/416* | (2006.01) | |

(52) U.S. Cl.
CPC ............ *E21B 47/024* (2013.01); *E21B 47/12* (2013.01); *G05B 19/416* (2013.01); *G05B 2219/45129* (2013.01)

(56) References Cited

U.S. PATENT DOCUMENTS

| | | |
|---|---|---|
| 2012/0045013 A1 | 2/2012 | Chen et al. |
| 2012/0292110 A1* | 11/2012 | Downton .............. E21B 47/022 175/45 |
| 2014/0034386 A1 | 2/2014 | Nessjoen et al. |
| 2014/0200868 A1* | 7/2014 | Motto .................. G06F 17/5009 703/2 |
| 2014/0318865 A1* | 10/2014 | Doris ..................... E21B 44/00 175/40 |
| 2016/0290118 A1* | 10/2016 | Xue ........................ E21B 47/00 |

OTHER PUBLICATIONS

International Search Report and Written Opinion received for PCT Patent Application No. PCT/US2015/049343, dated Jan. 22, 2016; 14 pages.

International Preliminary Report on Patentability received for PCT Patent Application No. PCT/US2015/049343, dated Mar. 23, 2017; 9 pages.

Barhouse, Katrina H. "Stability and Minimum Cost Analysis of a Discrete-Time Disturbance Accommodation Controller." 2009; 137 pages.

Tshiofwe, Isaac M. Extensions of Observer-based Disturbance Minimization Control. 2001; 38 pages.

Harris, Matthew W., Behçet Açikmşe, and Eric van Oort. "LMI Based Control of Stick-Slip Oscillations in Drilling." ASME 2014 Dynamic Systems and Control Conference. American Society of Mechanical Engineers, 2014; 8 pages.

* cited by examiner

LMI-BASED CONTROL OF STICK-SLIP OSCILLATIONS IN DRILLING

RELATED APPLICATIONS

This application is a continuation application of International Application No. PCT/US2015/049343 filed Sep. 10, 2015, which designates the United States, which claims priority to U.S. Provisional Application Ser. No. 62/049,146 filed Sep. 11, 2014, and which is incorporated herein by reference in its entirety.

TECHNICAL FIELD

The present disclosure relates generally to downhole drilling tools and, more particularly, to controlling oscillation of downhole drilling tools during drilling operations.

BACKGROUND

Hydrocarbons, such as oil and gas, are commonly extracted from subterranean formations. The development of subterranean operations and the processes involved in removing hydrocarbons from a subterranean formation are complex. Typically, subterranean operations involve a number of different steps such as, for example, drilling the wellbore at a desired well site, treating the wellbore to optimize production of hydrocarbons, and performing the necessary steps to produce and process the hydrocarbons from the subterranean formation.

Various types of tools are used to form wellbores in subterranean formations for recovering hydrocarbons such as oil and gas lying beneath the surface. Examples of such tools include rotary drill bits, hole openers, reamers, and coring bits. In drilling applications utilizing a rotary drill bit, a top drive system is used to rotate a drill string including a rotary drill bit. As the drill bit rotates, it cuts into the formation so that a reservoir can be reached and hydrocarbons extracted. The drill bit is most effective when it rotates smoothly and at a fixed rate. The interactions between the drill bit and the formation, however, are non-linear and random in nature, which prevents smooth, fixed-rate rotation of the drill bit.

BRIEF DESCRIPTION OF THE DRAWINGS

For a more complete understanding of the present disclosure and its features and advantages, reference is now made to the following description, taken in conjunction with the accompanying drawings, in which.

DETAILED DESCRIPTION

Oscillations caused by interactions between the drill bit and the formation may cause significant damage to the drilling system, including damage to drill pipes, drill bits, and other downhole tools. Such harmful oscillations include, but are not limited to, stick-slip oscillations. When a large static friction occurs at the drill bit, it causes the drill bit to "stick." That is, the drill bit stops rotating within the wellbore. Because the drill string is being rotated at the top, torque builds in the drill string until the static friction at the drill bit is overcome and the drill bit "slips" free. When the drill bit slips, the sudden drop in friction and the associated release of energy results in a high rotational speed at the drill bit. If the drilling system is not controlled, the energy will dissipate, causing the drill bit to stick again and repeating the stick-slip process. The oscillations caused by this stick-slip process travel up the drill string and may cause damage to the drilling system and the wellbore; thus increasing drilling time and cost.

In this disclosure, a system and method for actively controlling the drilling system to minimize the effect of stick-slip oscillations is disclosed. Embodiments of the present disclosure and its advantages are best understood by referring to FIGS. 1 through 5, where like numbers are used to indicate like and corresponding parts.

Figure 1:
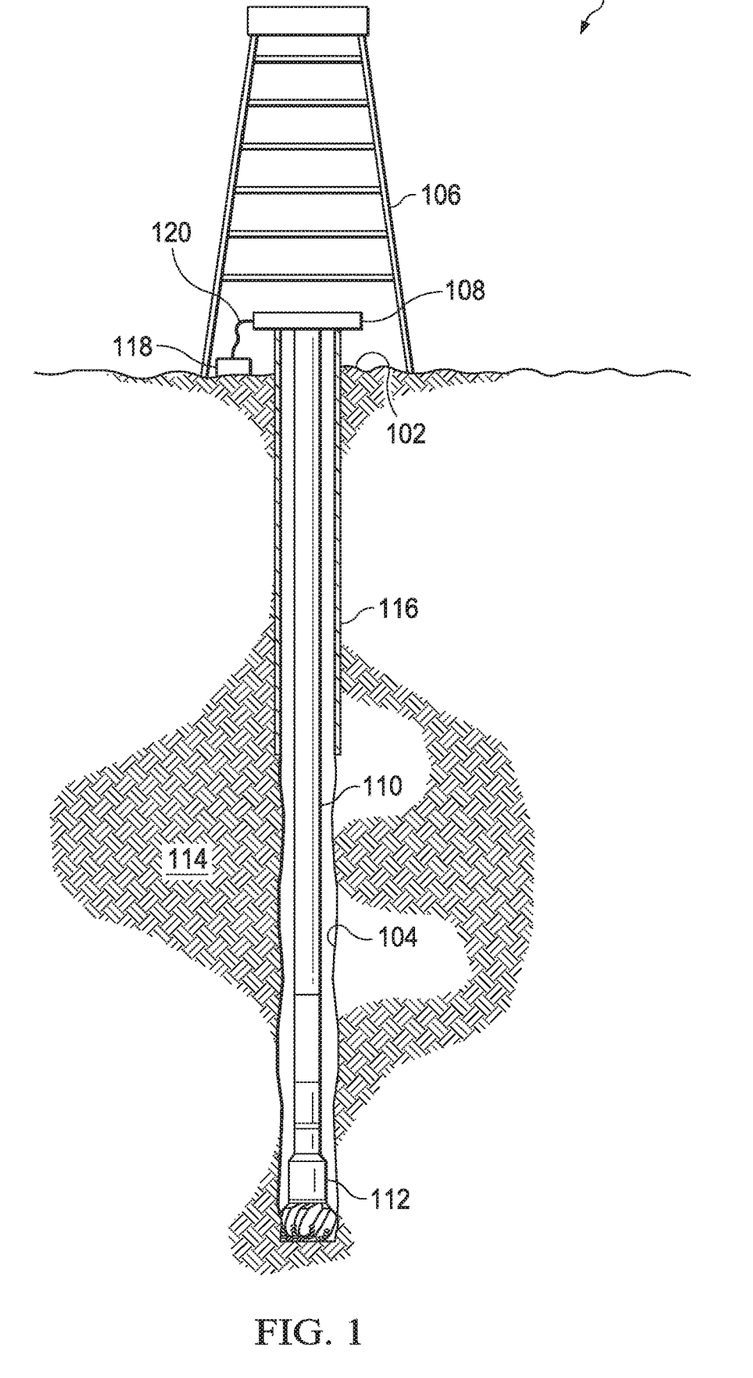
FIG. 1 is an elevation view of an example embodiment of a drilling system configured to perform drilling operations in accordance with some embodiments of the present disclosure.

FIG. 1 is an elevation view of an example embodiment of a drilling system configured to perform drilling operations in accordance with some embodiments of the present disclosure. Drilling system 100 may include well surface or well site 102 associated with wellbore 104. Casing string 116 may be placed in wellbore 104 and held in place by cement, which may be injected between casing string 116 and the sidewalls of wellbore 104. Casing string 116 may extend from well surface 102 to a downhole location within wellbore 104. The portions of wellbore 104, as shown in FIG. 1, that do not include casing string 116 may be described as "open hole."

Various types of drilling equipment such as a rotary table, drilling fluid pumps and drilling fluid tanks (not expressly shown) may be located at well surface or well site 102. For example, well site 102 may include drilling rig 106 that may have various characteristics and features associated with a "land drilling rig." However, drilling systems incorporating teachings of the present disclosure may be satisfactorily used with drilling equipment located on offshore platforms, drill ships, semi-submersibles and drilling barges (not expressly shown).

Drilling system 100 may also include drive system 108 coupled to a drill string 110. Drive system 108 may be configured to apply a torque to drill string 110 such that the applied torque induces rotation of drill string 110. Drill string 110 may include several sections of drill pipe that communicate drilling fluid from wellbore 104. The downhole end of drill string 110 may be coupled to drill bit 112 such that rotation of drill string 110 induces rotation of drill bit 112. As drill bit 112 rotates, it cuts into formation 114 to form or extend wellbore 104. Drill bit 112 may be used to form a wide variety of wellbores.

The term "wellbore" may be used to describe any hole drilled into a formation for the purpose of exploration or extraction of natural resources such as, for example, hydrocarbons. The terms "uphole" and "downhole" may be used to describe the location of various components of drilling system 100 relative to the bottom or end of wellbore 104 shown in FIG. 1. For example, a first component described as uphole from a second component may be further away from the end of wellbore 104 than the second component. Similarly, a first component described as being downhole from a second component may be located closer to the end of wellbore 104 than the second component.

Drilling system 100 may further include control system 118, which may be communicatively coupled to drive system 108 via communication link 120. Communication link 120 may control system 118 to send communications and receive communications from drive system 108. Control system 118 may also be communicatively coupled to sensors associated with drill string 110 and drill bit 112 (not expressly shown) such that control system 118 may send communications to and/or receive communications from such sensors. Control system 118 may be configured to actively control the torque applied to drill string 110 by drive system 108 in order to minimize the effects of stick-slip oscillations.

Figure 2:
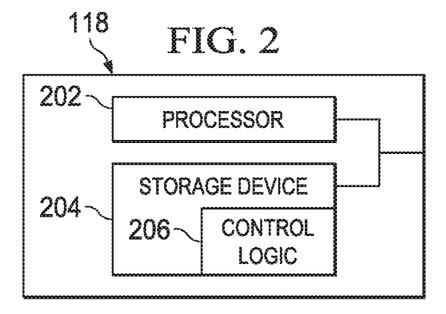
FIG. 2 illustrates an example embodiment of a control system in accordance with some embodiments of the present disclosure.

FIG. 2 illustrates an example embodiment of a control system in accordance with some embodiments of the present disclosure. Control system 118 may include processor 202, storage device 204, and control logic 206. Processor 202 may include any system, device, or apparatus operable to interpret and/or execute program instructions and/or process data, and may include without limitation a microprocessor, microcontroller, digital signal processor (DSP), application specific integrated circuit (ASIC), or any other digital or analog circuitry configured to interpret and/or execute program instructions and/or process data. In some embodiments, processor 202 may interpret and/or execute program instructions and/or process data stored in storage device 204 and/or another component control system 118 and/or drilling system 100.

Storage device 204 may include any instrumentality or aggregation of instrumentalities that may retain data and/or instructions for a period of time. For example, storage device 204 may include random access memory (RAM), electrically erasable programmable read-only memory (EEPROM), a Personal Computer Memory Card International Association (PCMCIA) card, flash memory, solid state disks, hard disk drives, magnetic tape libraries, optical disk drives, magneto-optical disk drives, compact disk drives, compact disk arrays, disk array controllers, and/or any suitable selection or array of volatile or non-volatile memory operable to store data.

Control logic 206 may include program instructions stored in storage device 204 and/or another component of control system 118 and/or drilling system 100 for determining the torque to be applied to drill string 110 by drive system 108 in order to minimize the effects of stick-slip oscillations. For example, when executed by processor 202, control logic 206 may cause processor 202 to determine the torque to be applied to drill string 110 by drive system 108. Such determinations may be made at regular intervals during the operation of drilling system 100. Once such a determination has been made, control logic 206 may further cause processor 202 to send a communication to drive system 108 including instructions regarding the torque to be applied to drill string 110 by drive system 108.

Figure 3:
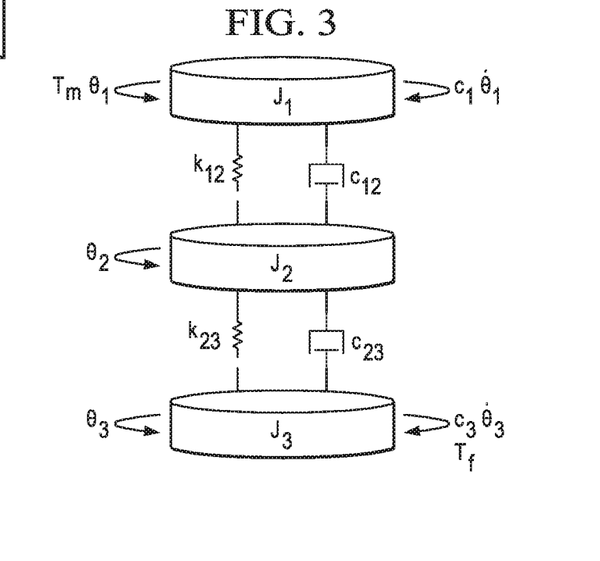
FIG. 3 illustrates a drilling system modeled as a linear system having three degrees of freedom.

Drilling system 100 can be modeled as a linear system subject to control torques from drive system 108 and friction at drill bit 112. For example, FIG. 3 illustrates a drilling system modeled as a linear system having three degrees of freedom. The inertias for the drive system, drill string, and drill bit may be represented by $J_1$, $J_2$, and $J_3$, respectively. The angular position of the drive system, drill string, and drill bit may be represented by $\theta_1$, $\theta_2$, and $\theta_3$, respectively, while the rotational speed of the drive system, drill string, and drill bit may be represented by $\dot{\theta}_1$, $\dot{\theta}_2$, and $\dot{\theta}_3$ respectively. As shown in FIG. 3, $J_1$, $J_2$, and $J_3$ are connected by torsional springs $k_{12}$ and $k_{23}$ and dampers $c_{12}$ and $c_{23}$, which may be used to model the structural properties of the drill string. Coefficients $c_1$ and $c_3$ may be used to model the viscous damping experiences by the drive system and drill bit. The torque applied by the drive system may be represented by $T_m$, while the frictional torque experienced by the drill bit may be represented by $T_f$.

Using the model illustrated in FIG. 3, the equations of motion for the drilling system may be expressed as three second-order ordinary differential equations, which are shown below as equations [1]-[3], where $\ddot{\theta}_1$, $\ddot{\theta}_2$, and $\ddot{\theta}_3$ represent the acceleration of the drive system, drill string, and drill bit, respectively.

$$J_1\ddot{\theta}_1 + (c_{12}+c_1)\dot{\theta}_1 + k_{12}\theta_1 = c_{12}\dot{\theta}_2 + k_{12}\theta_2 + T_m \quad [1]$$

$$J_2\ddot{\theta}_2 + (c_{12}+c_{23})\dot{\theta}_2 + (k_{12}+k_{23})\theta_2 = c_{12}\dot{\theta}_1 + k_{12}\theta_1 + c_{23}\dot{\theta}_3 + k_{23}\theta_3 \quad [2]$$

$$J_3\ddot{\theta}_3 + (c_{23}+c_3)\dot{\theta}_3 + k_{23}\theta_3 = c_{23}\dot{\theta}_2 + k_{23}\theta_2 - T_f \quad [3]$$

This model is linear except for the frictional torque, $T_f$, experienced by the drill bit, which is a non-linear function of the rotation speed of the drill bit, $\dot{\theta}_3$. The frictional torque, $T_f$, experienced by the drill bit may be modeled as a piecewise function, which is shown below as equation [4], defined during the sticking phase, transition from sticking to slipping, and the slipping phase, where $\dot{\theta}_c$ and $T_c$ are constants.

$$T_f = \begin{cases} T_{stick} & |\dot{\theta}_3| < \dot{\theta}_c \text{ and } |T_r| \le T_c \\ T_{trans} & |\dot{\theta}_3| < \dot{\theta}_c \text{ and } |T_r| > T_c \\ T_{slip} & |\dot{\theta}_3| \ge \dot{\theta}_c \end{cases} \quad [4]$$

The constant $\dot{\theta}_c$ may be chosen as a small, but non-zero number for modeling purposes. The constant $T_c$ represents the torque required to overcome the static friction that causes the drill bit to stick, while $T_r$ represents the reaction torque that builds up in the drill string when the drill bit sticks. The reaction torque, $T_r$, may be represented by equation [5], which is shown below.

$$T_r = c_{23}(\dot{\theta}_2 - \dot{\theta}_3) + k_{23}(\theta_2 - \theta_3) - c_3\dot{\theta}_3 \quad [5]$$

Thus, the actual friction torques for the three phases of $T_f$ may be represented using equations [6]-[8], which are shown below.

$$T_{stick} = T_r \quad [6]$$

$$T_{trans} = T_c \, \text{sign}(T_r) \quad [7]$$

$$T_{slip} = R_b W[\mu_c + (\mu_s - \mu_c)e^{-\gamma|\dot{\theta}_3|}] \, \text{sign}(\dot{\theta}_3) \quad [8]$$

As used in equation [8], $R_b$ represent the radius of the drill bit, W represents the weight on the drill bit, $\mu_s$ is the static friction coefficient, $\mu_c$ is the Coulomb friction coefficient, and $\gamma$ represents the rate at which the speed of the drill bit decreases.

Using equations [1]-[8], a mathematical model may be constructed that simulates operation of the drilling system. Each of the parameters included in equations [1]-[8] may be bounded above and below. For example, the inertia for the drill bit, $J_3$, may satisfy the inequality expressed in equation [9] below, where the under-bar indicates the lower bound and the over-bar indicates the upper bound.

$$\underline{J_3} \leq J_3 \leq \overline{J_3} \quad [9]$$

In some embodiments, the numerical values shown in TABLE 1 may be used for the parameters included in equations [1]-[8] to simulate operation of the drilling system. For example, using the mathematical model described above and the parameters shown in TABLE 1, the operation of the drilling system may be simulated and the stick-slip process may be demonstrated.

TABLE 1

| Parameter | Value |
| --- | --- |
| $J_1$ | 2,122 kgm² |
| $J_2$ | 750 kgm² |
| $J_3$ | 472 kgm² |
| $c_{12}$ | 140 Nms/rad |
| $c_{23}$ | 181 Nms/rad |
| $c_1$ | 425 Nms/rad |
| $k_{12}$ | 698 Nm/rad |
| $k_{23}$ | 907 Nm/rad |
| $c_3$ | 50 Nms/rad |
| $\mu s$ | 0.8 |
| $\mu c$ | 0.5 |
| $\gamma$ | 0.9 |
| $\dot{\theta}_c$ | $10^{-6}$ rad/s |
| $T_c$ | 9,224 Nm |
| $R_b$ | 0.155 m |
| W | 74,386 N |

Figure 4:
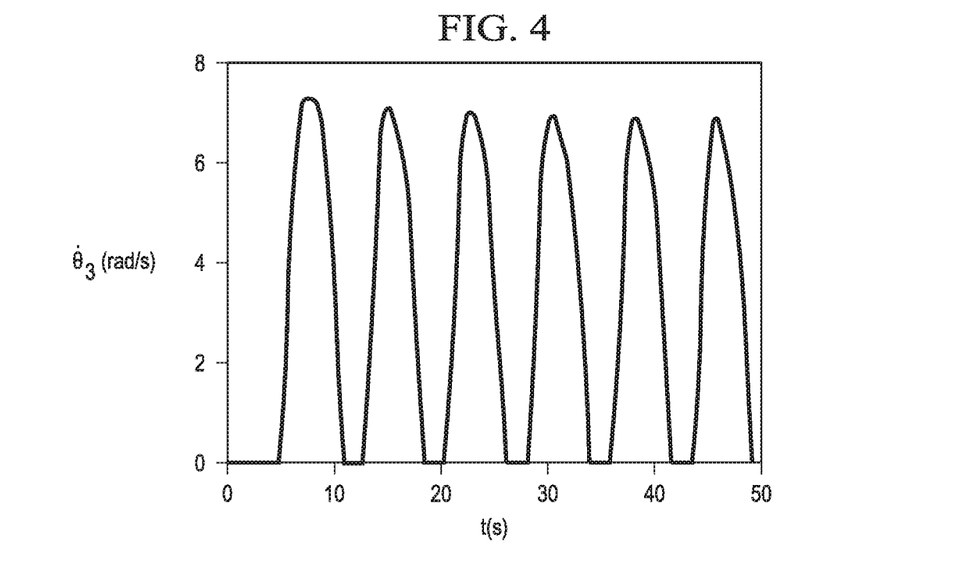
FIG. 4 is a graph of drill bit speed, $\dot{\theta}_3$, as a function of time, which illustrates the stick-slip oscillations that occur when a constant drive system torque, $T_m$, is applied.

FIG. 4 is a graph of drill bit speed, $\dot{\theta}_3$, as a function of time, which illustrates the stick-slip oscillations that occur when a constant drive system torque, $T_m$, is applied. To generate the graph shown in FIG. 4, a constant drive system torque, $T_m$, of 8,138 Nm was applied. As shown in FIG. 4, the drill bit starts at rest (e.g., $\dot{\theta}_3$=0 rad/s). Initially, the torque, $T_m$, applied by the drive system is not enough to overcome static friction. Reaction torque, $T_r$, builds up in the drill string until approximately t=5 seconds, at which point the drill bit slips. When the drill bit slips, the drill bit speed, $\dot{\theta}_3$, increases to approximately 7 rad/s. Where, as is true for the system modeled in FIG. 3, there is no control system to compensate for the sudden change in drill bit speed, $\dot{\theta}_3$ and the associated release of energy, the process repeats itself and the drill bit speed, $\dot{\theta}_3$, returns to 0 rad/s. As shown in FIG. 4, this stick-slip process repeats itself five more times before t=50 seconds.

In accordance with the teachings of the present disclosure, a control system of the drilling system may be utilized to vary the torque, $T_m$, applied by the drive system during operation of the drilling system in order to minimize the effect of stick-slip oscillations. Because the frictional torque, $T_f$, experienced by the drill bit is uncertain, it may be treated as a disturbance acting on the system. By defining the state vector $x=[\theta_1, \dot{\theta}_1, \theta_2, \dot{\theta}_2, \theta_3, \dot{\theta}_3]^T$, control variable $u=T_m$, and disturbance $w=T_f$, the sixth order system discussed in conjunction with FIG. 3 may be expressed as six first-order equations in the standard state-space form $\dot{x}=Ax+Bu+Ew$.

Given the imperfections in the actual drilling system, the matrices (A, B, E) are not certain. Instead, matrices (A, B, E) are elements of a convex set. The vertices of this set are denoted with a subscript such as ($A_i$, $B_i$, $E_i$) so that the matrices (A, B, E) may be represented by equation [10] below, where co denotes the convex hull. The (A, B, E) system defined by equation [10] contains fourteen (14) non-trivial entries; thus, the convex hull is defined by $p=2^{14}=16,384$ vertices.

$$(A, B, E) \in co\{(A_1, B_1, E_1), (A_2, B_2, E_2), \ldots, (A_p, B_p, E_p)\} \quad [10]$$

The control system may be configured to control the torque, $T_m$, applied by the drive system in order to minimize the effect of the disturbance created by the frictional torque, $T_f$, experienced by the drill bit. The torque, $T_m$, to be applied by the drive system may be determined using a set of linear matrix inequalities ("LMIs") for the system. These LMIs may be represented by equations [11]-[13] below, where I is the identity matrix, T is the matrix transpose, $\eta$ is the bound on the L2 gain for the output to disturbance ratio, and $\mu$ is the bound on the control magnitude.

$$\begin{bmatrix} A_iQ + Q^TA_i^T + B_iY + Y^TB_i^T + E_iE_i^T & Q^TC^T \\ CQ & -\eta^2 I \end{bmatrix} \leq 0 \forall i = 1, \ldots, p \quad [11]$$

$$\begin{bmatrix} 1 & e(0)^T \\ e(0) & Q \end{bmatrix} \geq 0 \text{ and } \begin{bmatrix} Q & Y^T \\ Y & \mu^2 I \end{bmatrix} \geq 0 \quad [12]$$

The torque, $T_m$, to be applied by the drive system in order to minimize the effect of the disturbance created by the frictional torque, $T_f$, experienced by the drill bit may be determined by solving the LMIs expressed in equations [11] and [12] for the variables Q and Y. Although solving the LMIs expressed in equations [11] and [12] is beyond ordinary human analytical methods, these equations may be solved using control logic included in a control system of the drilling system without human intervention. As an example, the LMIs expressed in equations [11] and [12] may be solved using numerical algorithms called interior-point methods, which can solve LMIs in a pre-determined number of operations.

The LMI expressed in equation [11] may ensure minimization of the disturbance created by the frictional torque, $T_f$, experienced by the drill bit, while the LMI's expressed in equation [12] may ensure that the torque, $T_m$, applied by the drive system falls within the upper and lower bounds for that parameter. Thus, the LMI expressed in equation [11] may be referred to as a disturbance minimization LMI and the LMIs expressed in equation [12] may be referred to as magnitude constraint LMIs.

Figure 5A:
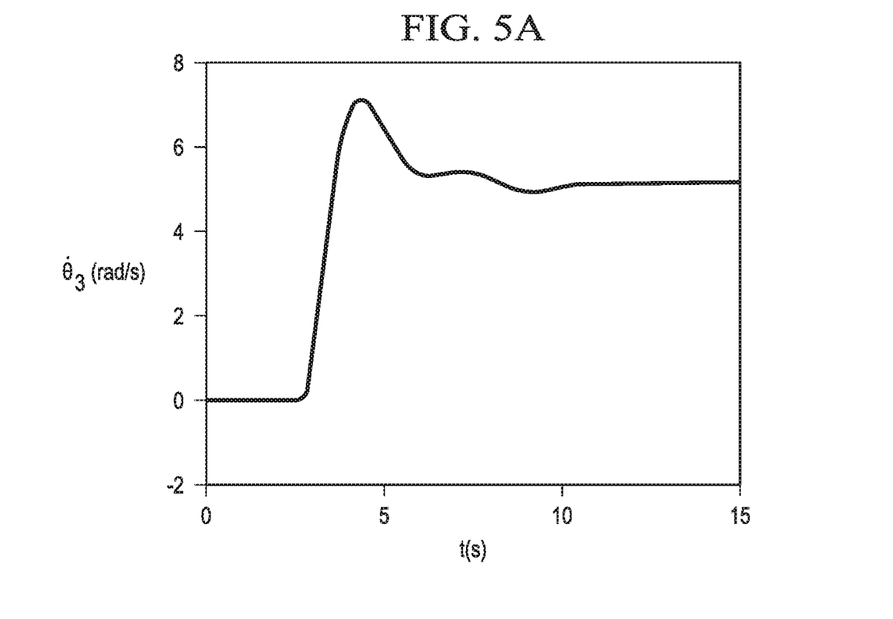
FIG. 5A illustrates drill bit speed, $\dot{\theta}_3$, as a function of time when a drive system torque, $T_m$, determined using equation [11] is applied.
Figure 5B:
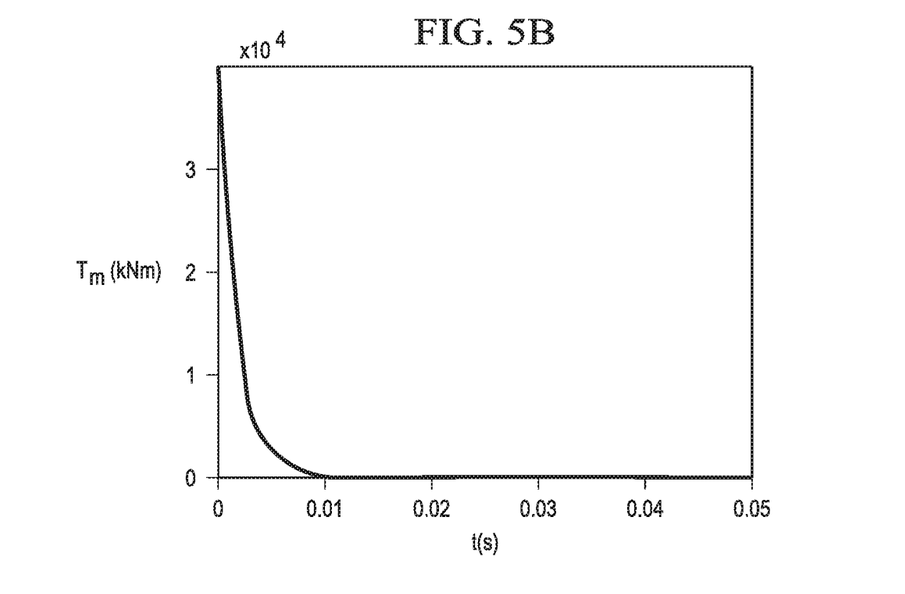
FIG. 5B illustrates drive system torque, $T_m$, determined using equation [11] as function of time.

For example, utilizing a disturbance minimization LMI, such as that expressed in equation [11], to determine the torque, $T_m$, to be applied by the drive system may minimize the effect of the disturbance created by the frictional torque, $T_f$, experienced by the drill bit, but result in a torque, $T_m$, that exceeds the upper bound of the torque, $T_m$, that can feasibly be applied by the drive system. FIG. 5A illustrates drill bit speed, $\dot{\theta}_3$, as a function of time when a drive system torque, $T_m$, determined using equation [11] is applied. As shown in FIG. 5A, the drill bit starts at rest and continues to stick for approximately 3 seconds before static friction is overcome and the drill bit slips. When the drill bit slips, the drill bit speed increases rapidly before settling to a drill bit speed of approximately 5 rads/s. In this example, the settling time is very short (e.g., less than 5 seconds). FIG. 5B illustrates drive system torque, $T_m$, determined using equation [11] as function of time. The initial torque, $T_m$, required to overcome static friction is approximately $4 \times 10^4$ kNm. Given that a reasonable upper bound for torque, $T_m$, is 20 kNm, the torque, $T_m$, determined using equation [11] alone is not a feasible solution.

Figure 6A:
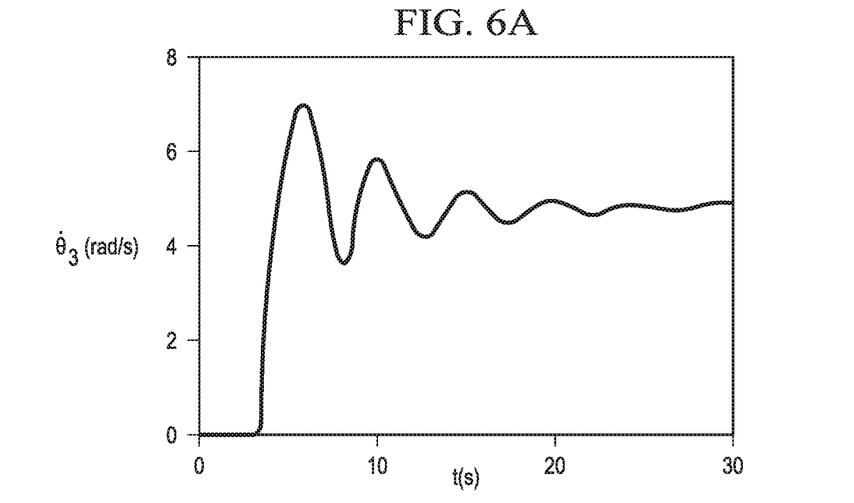
FIG. 6A illustrates drill bit speed, $\dot{\theta}_3$, as a function of time when a drive system torque, $T_m$, determined using equations [11]-[13] is applied.
Figure 6B:
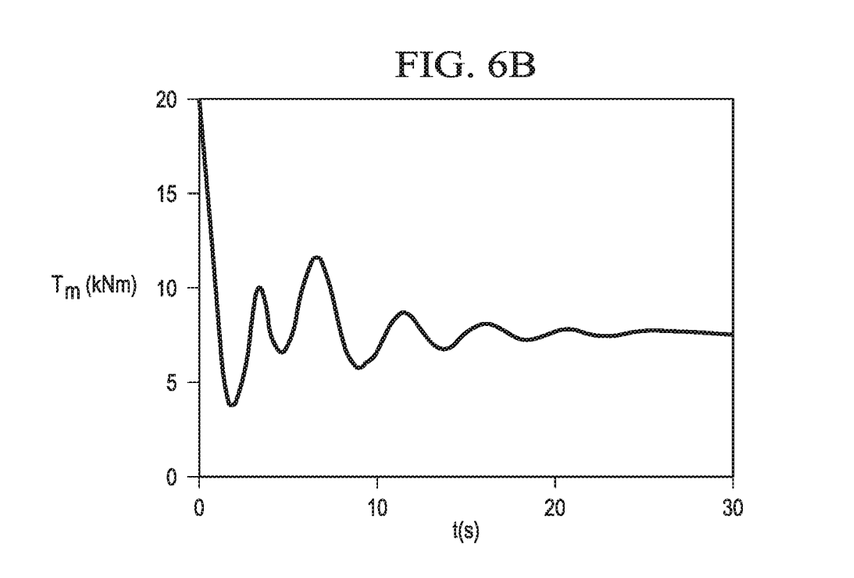
FIG. 6B illustrates drive system torque, $T_m$, determined using equations [11]-[13] as function of time.

In contrast, utilizing the combination of a disturbance minimization LMI, such as that expressed in equation [11], and magnitude constraint LMIs, such as those expressed in equation [12], to determine the torque $T_m$, to be applied by the drive system may minimize the effect of the disturbance created by the frictional torque, $T_f$, experienced by the drill bit, while also ensuring that the torque, $T_m$, applied by the drive system falls within the upper and lower bounds for that parameter. FIG. 6A illustrates drill bit speed, $\dot{\theta}_3$, as a function of time when a drive system torque, $T_m$, determined using equations [11]-[13] is applied. As shown in FIG. 6A, the drill bit starts at rest and continues to stick for approximately 3-5 seconds before static friction is overcome and the drill bit slips. When the drill bit slips, the drill bit speed increases rapidly before settling to a bit speed of approximately 5 rads/s. When compared with FIG. 5A, the settling process is slower and more oscillatory. FIG. 6B illustrates drive system torque, $T_m$, determined using equations [11]-[13] as function of time. In contrast with FIG. 5B, the torque, $T_m$, applied by the drive system is bounded by upper and lower bounds for that parameter. The initial torque, $T_m$, required to overcome static friction is approximately 20 kNm.

The control system receives communications including values for drilling system parameters. For example, the control system may receive communications from the drive system including values for parameters including the angular position of the drive system, $\theta_1$, and/or the rotational speed of drive system, $\dot{\theta}_1$. The control system may also receive communications from sensors associated with drill string 110 and drill bit 112. Such communications may include values for parameters including the angular position of drill string, $\theta_2$, angular position of the drill bit, $\theta_3$, rotational speed of the drill string, $\dot{\theta}_2$, and/or rotational speed of the drill bit, $\dot{\theta}_3$. Based on the drilling system parameter values received from the drive system and/or the sensors, the control system may solve the LMIs expressed in equations [11] and [12] using interior-point methods.

Figure 7:
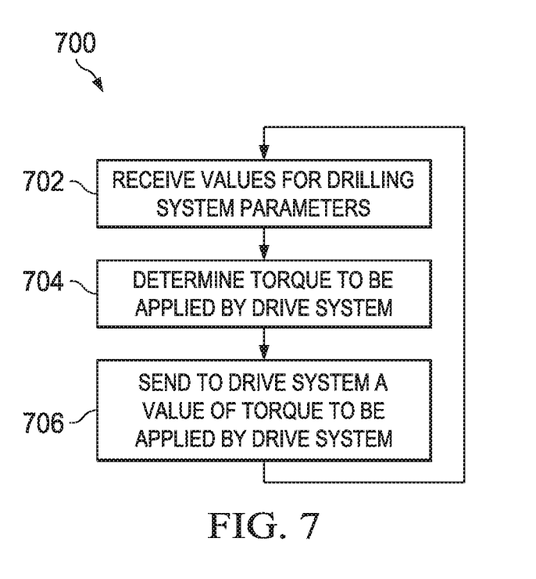
FIG. 7 is a flow chart illustrating a method of actively controlling a drilling system to minimize the effect of stick-slip oscillations.

FIG. 7 is a flow chart illustrating a method of using such a control system to actively control a drilling system to minimize the effect of stick-slip oscillations. The method 700 may begin, and at step 702 the control system may receive one or more communications including values for drilling system parameters. For example, the control system may receive communications from the drive system including values for parameters including the angular position of the drive system, $\theta_1$, and/or the rotational speed of drive system, $\dot{\theta}_1$. The control system may also receive communications from sensors associated with drill string 110 and drill bit 112 including values for parameters including the angular position of drill string, $\theta_2$, angular position of the drill bit, $\theta_3$, rotational speed of the drill string, $\dot{\theta}_2$, and/or rotational speed of the drill bit, $\dot{\theta}_3$.

At step 704, the control system may determine the torque, $T_m$, to be applied by the drive system to minimize the effect of the disturbance created by the frictional torque, $T_f$, experienced by the drill bit. For example, based on the drilling system parameter values received from the drive system and/or the sensors, the control system may determine the torque, $T_m$, to be applied by the drive system to minimize the effect of the disturbance created by the frictional torque, $T_f$, experienced by the drill bit. The torque, $T_m$, to be applied by the drive system may be determined using a set of linear matrix inequalities ("LMIs") for the system. To ensure minimization of the disturbance created by the frictional torque, $T_f$, experienced by the drill bit, while also ensuring that the torque, $T_m$, applied by the drive system falls within the upper and lower bounds for that parameter, the torque, $T_m$, to be applied by the drive system may be determined by utilizing a combination of a disturbance minimization LMI, such as that expressed in equation [11] above, and magnitude constraint LMIs, such as those expressed in equation [12] above. The control system may utilize interior-point methods to solve the disturbance minimization and magnitude constraint LMIs LMIs in a pre-determined number of operations.

At step 706, the control system may send a communication to the drive system including a value for the torque, $T_m$, that the control system determined should be applied by the drive system. The method may then return to step 702 and the method may be repeated such that the torque, $T_m$, to be applied by the drive system is determined based on drilling system parameter values received from the drive system and/or the sensors and communicated to the drive system at regular intervals.

Modifications, additions, or omissions may be made to method 700 without departing from the scope of the present disclosure. For example, the order of the steps may be performed in a different manner than that described and some steps may be performed at the same time. Additionally, each individual step may include additional steps without departing from the scope of the present disclosure.

Although the present disclosure and its advantages have been described in detail, it should be understood that various changes, substitutions and alterations can be made herein without departing from the spirit and scope of the disclosure as defined by the following claims.

What is claimed is:

1. A control system for controlling stick-slip oscillations in a drilling system, comprising:
    a processor; and
    a memory communicatively coupled to the processor with computer program instructions stored therein, the instructions configured to, when executed by the processor, cause the processor to:
      receive a communication including a value of a drilling system parameter;
      determine, based on the value of the drilling system parameter, a value for a torque to be applied to a drill string to reduce the effect of stick-slip oscillations, wherein the value for the torque is determined by solving a set of linear matrix inequalities including a disturbance minimization linear matrix inequality, a first magnitude constraint linear matrix inequality, and a second magnitude constraint linear matrix inequality; and
      transmit to a drive system the value for the torque to be applied to the drill string by the drive system;
      wherein the disturbance minimization linear matrix inequality comprises:

$$\begin{bmatrix} A_i Q + Q^T A_i^T + B_i Y + Y^T B_i^T + E_i E_i^T & Q^T C^T \\ CQ & -\eta^2 I \end{bmatrix} \leq 0 \; \forall \; i = 1, \ldots, p.$$

2. The system of claim 1, wherein the drilling system parameter includes at least one of angular position of a drive system of the drilling system, the rotational speed of the drive system, angular position of the drill string, rotational speed of the drill string, angular position of a drill bit of the drilling system, or rotational speed of the drill bit.

3. The system of claim 1, wherein the drilling system receives the communication including the value of the drilling system parameter from a drive system of the drilling system, sensors associated with the drill string, or sensors associated with a drill bit of the drilling system.

4. The system of claim 1, wherein the computer program instructions are configured to, when executed by the processor, cause the processor to solve the set of linear matrix inequalities using interior point methods.

5. A control system for controlling stick-slip oscillations in a drilling system, comprising:
a processor; and
a memory communicatively coupled to the processor with computer program instructions stored therein, the instructions configured to, when executed by the processor, cause the processor to:
receive a communication including a value of a drilling system parameter;
determine, based on the value of the drilling system parameter, a value for a torque to be applied to a drill string to reduce the effect of stick-slip oscillations, wherein the value for the torque is determined by solving a set of linear matrix inequalities including a disturbance minimization linear matrix inequality, a first magnitude constraint linear matrix inequality, and a second magnitude constraint linear matrix inequality; and
transmit to a drive system the value for the torque to be applied to the drill string by the drive system;
wherein the first magnitude constraint linear matrix inequality comprises:

$$\begin{bmatrix} 1 & e(0)^T \\ e(0) & Q \end{bmatrix} \geq 0.$$

6. The system of claim 5, wherein the drilling system parameter includes at least one of angular position of a drive system of the drilling system, the rotational speed of the drive system, angular position of the drill string, rotational speed of the drill string, angular position of a drill bit of the drilling system, or rotational speed of the drill bit.

7. The system of claim 5, wherein the drilling system receives the communication including the value of the drilling system parameter from a drive system of the drilling system, sensors associated with the drill string, or sensors associated with a drill bit of the drilling system.

8. The system of claim 5, wherein the computer program instructions are configured to, when executed by the processor, cause the processor to solve the set of linear matrix inequalities using interior point methods.

9. A control system for controlling stick-slip oscillations in a drilling system, comprising:
a processor; and
a memory communicatively coupled to the processor with computer program instructions stored therein, the instructions configured to, when executed by the processor, cause the processor to:
receive a communication including a value of a drilling system parameter;
determine, based on the value of the drilling system parameter, a value for a torque to be applied to a drill string to reduce the effect of stick-slip oscillations, wherein the value for the torque is determined by solving a set of linear matrix inequalities including a disturbance minimization linear matrix inequality, a first magnitude constraint linear matrix inequality, and a second magnitude constraint linear matrix inequality; and
transmit to a drive system the value for the torque to be applied to the drill string by the drive system;
wherein the second magnitude constraint linear matrix inequality comprises:

$$\begin{bmatrix} Q & Y^T \\ Y & \mu^2 I \end{bmatrix} \geq 0.$$

10. The system of claim 9, wherein the drilling system parameter includes at least one of angular position of a drive system of the drilling system, the rotational speed of the drive system, angular position of the drill string, rotational speed of the drill string, angular position of a drill bit of the drilling system, or rotational speed of the drill bit.

11. The system of claim 9, wherein the drilling system receives the communication including the value of the drilling system parameter from a drive system of the drilling system, sensors associated with the drill string, or sensors associated with a drill bit of the drilling system.

12. The system of claim 9, wherein the computer program instructions are configured to, when executed by the processor, cause the processor to solve the set of linear matrix inequalities using interior point methods.

* * * * *